United States Patent
Brocheton

(12) 
(10) Patent No.: US 6,255,238 B1
(45) Date of Patent: Jul. 3, 2001

(54) IR AND UV ABSORBING BROWN SOLAR GLASSES, OPHTHALMIC LENSES

(75) Inventor: Yves A. H. Brocheton, Fontenay-sous-Bois (FR)

(73) Assignee: Corning S.A., Avon Cedex (FR)

( * ) Notice: Subject to any disclaimer, the term of this patent is extended or adjusted under 35 U.S.C. 154(b) by 0 days.

(21) Appl. No.: 09/403,624

(22) PCT Filed: Apr. 27, 1998

(86) PCT No.: PCT/US98/08444

§ 371 Date: Feb. 7, 2000

§ 102(e) Date: Feb. 7, 2000

(87) PCT Pub. No.: WO98/50314

PCT Pub. Date: Nov. 12, 1998

Related U.S. Application Data

(60) Provisional application No. 60/051,524, filed on Jul. 2, 1997.

(30) Foreign Application Priority Data

May 7, 1997 (FR) .................................................. 97 05632

(51) Int. Cl.$^7$ .......................... C03C 3/083; C03C 3/085; C03C 3/087; C03C 3/089; C03C 3/091

(52) U.S. Cl. .............................. 501/56; 501/58; 501/59; 501/65; 501/66; 501/67; 501/68; 501/69; 501/70; 501/71; 501/72; 501/904; 501/905; 351/163

(58) Field of Search .................................. 501/56, 57, 58, 501/59, 65, 66, 67, 68, 69, 70, 71, 72, 904, 905; 351/163

(56) References Cited

U.S. PATENT DOCUMENTS

| | | | |
|---|---|---|---|
| 2,892,726 | * | 6/1959 | Smith et al. . |
| 3,296,005 | * | 1/1967 | Duncan et al. . |
| 5,256,607 | * | 10/1993 | Kerko et al. ............................ 501/65 |
| 5,403,789 | * | 4/1995 | Kerko et al. ............................ 501/65 |
| 5,405,811 | * | 4/1995 | Kerko et al. ............................ 501/66 |
| 5,438,024 | * | 8/1995 | Bolton et al. ........................... 501/55 |
| 5,446,007 | * | 8/1995 | Krashkevich et al. ................. 501/64 |

* cited by examiner

Primary Examiner—David R Sample
(74) Attorney, Agent, or Firm—Milton M. Peterson

(57) ABSTRACT

The object of the present invention is brown solar glasses, absorbing UV or IR radiation, as well as solar ophthalmic lenses in said glasses. Said glasses have the following composition, expressed in percentages by weight: $SiO_2$: 64–71; $B_2O_3$: 2–8; $Al_2O_3$: 0–4; $ZrO_2$: 0–2; $Li_2O$: 0–4; $Na_2O$: 6–10; $K_2O$: 7–16; CaO: 0–5.5; ZnO: 0–5.5; $TiO_2$: 0–2; $Fe_2O_3$: 3–9; $Co_3O_4$: 0–0.030; NiO: 0–0.2; $SeO_2$: 0.0030–0.1; $As_2O_3$: 0–0.1; $Sb_2O_3$: 0–0.1; $SnO_2$: 0–0.1; Cl: 0–2; Br: 0–2; F: 0–2.

3 Claims, 1 Drawing Sheet

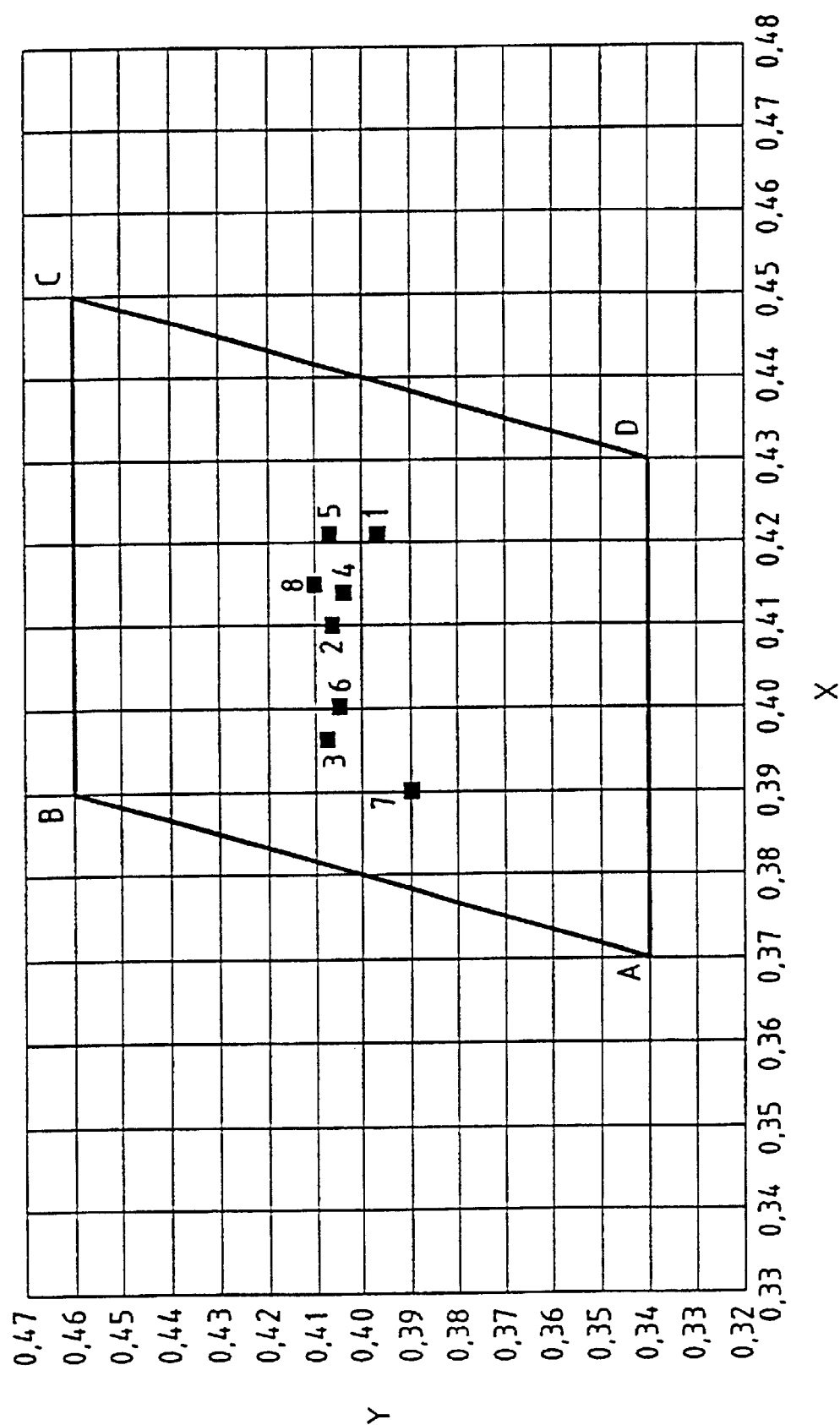

IR AND UV ABSORBING BROWN SOLAR GLASSES, OPHTHALMIC LENSES

This application is a 371 of PCT/US98/08444 Apr. 27, 1998 which claims benefit of Ser. No. 60/051,524 Jul. 2, 1997.

The objects of the present invention are brown solar glasses absorbing ultraviolet and infrared radiation, as well as ophthalmic lenses based on said glasses.

Numerous versions of solar glasses are available on the market; solar glasses characterized essentially by a tint, generally green, gray or brown. For their use as ophthalmic lenses, it is more and more required from these glasses that they absorb ultraviolet radiation. An additional specific requirement of this type of market bears upon the necessity to absorb near-infrared radiation. It is within this context that the Applicant desired to develop brown (fixed tint) colored solar glasses which are capable of absorbing UV and IR radiation.

More specifically, with reference to these specifications, the Applicant has developed glasses which, under a thickness of 2 mm, have the following characteristics:

a brown color located inside a polygon of chromaticity, such as defined by the following trichromatic coordinates:

|   | x | y |
|---|---|---|
| A | 0.3700 | 0.3400 |
| B | 0.3900 | 0.4600 |
| C | 0.4500 | 0.4600 |
| D | 0.4300 | 0.3400 | and which are presented in the annexed FIG. 1;

an integrated transmission typically greater than 10% in the visible part of the light spectrum and preferably greater than 15%. For the solar lens use, this level of transmission must be less than 25%;

the ability to recognize colored traffic lights, such as described in the standard ANSI Z80.3-1986;

an ultraviolet radiation absorption up to a minimal wavelength of 380 nm;

the ability to filter the radiation of the near-infrared part of the light spectrum. A glass meets this objective if the integrated transmission between 780 and 2,000 nm is lower than the integrated visible transmission between 380 and 780 nm. In practice and in the present text, the Applicant quantifies this property by measuring the transmission at the fixed wavelength of infrared, i.e. 1,100 nm. Based on his experience, the Applicant has been able to establish that the objective of filtration of infrared is attained if this level of transmission at 1,100 nm is lower than 10%;

a good resistance to chemical attacks;

a standard refractive index, i.e. 1.523.

According to the prior art, numerous compositions for fixed tint solar glasses have been proposed, thus:

a brown glass has been described in U.S. Pat. No. 5,446,007. Said brown glass contains in its composition cerium oxide, neodymium oxide and titanium oxide. These components do not intervene in the composition of the glasses of the invention;

gray glasses have been described in U.S. Pat. No. 5,438,024. Said gray glasses do not contain any selenium oxide, an essential component of the glasses of the invention. Moreover, arsenic is necessary in the composition of the glasses according to said U.S. Pat. No. 5,438,024, while it is only optional, even advantageously absent from the composition of the glasses of the invention, in view of the effects on the iron redox;

a brown glass has been described in U.S. Pat. No. 5,422,755. Said brown glass absorbs UV radiation but not near-infrared. Moreover, this glass does not contain any boron oxides, any iron oxides or any selenium oxides, which are present in the glasses of the invention;

the U.S. Pat. No. 5,405,811 describes a green glass absorbing ultraviolet and which is colored only with iron oxide;

the U.S. Pat. No. 5,403,789 describes brown glass compositions absorbing ultraviolet radiation. They contain both selenium and iron;

the compositions according to U.S. Pat. No. 5,362,689 only contain very small amounts of alkali oxides, but high concentrations of alkaline-earth oxides;

U.S. Pat. No. 5,256,607 describes gray solar glass compositions which have no particular tendency to absorb infrared radiation. Moreover, said compositions do not contain any selenium oxide;

the French application FR 95 15277, heretofore unpublished, describes brown solar glass compositions which absorb ultraviolet radiation but not infrared. Within such compositions, the presence of boron oxide is only optional, the presence of aluminum oxide is necessary and vanadium oxide is found.

In order to meet the specifications such as have been stated above, the Applicant proposes glass compositions which are entirely original in view of the prior art identified above.

The Applicant proposes novel brown solar glasses, absorbing ultraviolet radiation and that of near-infrared, which have the following composition, expressed in percentages by weight (of oxides and optionally halogen(s)):

| | |
|---|---|
| $SiO_2$ | 64–71 |
| $B_2O_3$ | 2–8 |
| $Al_2O_3$ | 0–4 |
| $ZrO_2$ | 0–2 |
| $Li_2O$ | 0–4 |
| $Na_2O$ | 6–10 |
| $K_2O$ | 7–16 |
| CaO | 0–5.5 |
| ZnO | 0–5.5 |
| $TiO_2$ | 0–2 |
| $Fe_2O_3$ | 3–9 |
| $Co_3O_4$ | 0–0.030 |
| NiO | 0–0.2 |
| $SeO_2$ | 0,0030–0.1 |
| $As_2O_3$ | 0–0.1 |
| $Sb_2O_3$ | 0–0.1 |
| $SnO_2$ | 0–0.1 |
| Cl | 0–2 |
| Br | 0–2 |
| F | 0–2. |

The glasses of the invention are essentially obtained, in a manner per se, from the constituents identified above taken in the quantities specified above. It is not totally excluded that at least one other constituent should intervene in their formulation but, in any case, such an intervention would not have a significant influence upon the properties sought-after, even less a harmful influence upon said properties.

Advantageously, the brown glasses of the invention contain neither any arsenic oxide, nor any antimony oxide (vide infra). Similarly, they contain neither any cerium oxide, nor any neodymium oxide.

According to a particularly advantageous variant of the invention, the glasses have the following composition by weight:

| | |
|---|---|
| $SiO_2$ | 66–69 |
| $B_2O_3$ | 3–5 |
| $Na_2O$ | 7–9 |
| $K_2O$ | 9–14 |
| CaO | 0.5–2 |
| $Fe_2O_3$ | 4–8 |
| $Co_3O_4$ | 0–0.020 |
| NiO | 0–0.16 |
| $SeO_2$ | 0.0050–0.0600 |
| Br | 0.5–1.5. |

Within the context of the particularly advantageous variant of the invention, the preferred ranges indicated above, in combinations with each other, are also preferred in themselves, independent from each other.

It is now suggested to revert back a little to their details which enable them to meet the specifications given above.

Several constituents of these compositions play a particular role. Thus, the oxides of alkali ions ($Li^+$, $Na^+$, $K^+$), in addition to their known action on the viscosity of the glass, also enable the glass undergo a chemical tempering by ion exchange between its surface and a molten salt bath into which it is immersed, and therefore to confer improved mechanical resistance characteristics to it. Such a chemical tempering method is familiar to the person skilled in the art.

If need be, the refractive index of the glass can be adjusted with the aid of said alkali oxides and calcium oxide, but also with the oxides of Ti, Zr and Zn, independently or in combination.

The optical characteristics of the glass rest on the one hand on the absorption of the ultraviolet radiation by the iron oxide in the ferric state ($Fe^{3+}$) and that of the infrared radiation by the same oxide, but in the ferrous state ($Fe^{2+}$). This result is obtained by a fine determination of the equilibrium between these two species, either by controlling the redox state of the system by the addition of oxides acting as a buffer, such as $As_2O_3$, $Sb_2O_3$ or $SnO_2$, or by adjusting the ferrous iron ($Fe^{2+}$) content by varying the total iron concentration in the glass. This method is well-known and leads to obtaining greenish glasses. According to the present invention, the second approach is preferred.

The technical problem solved by the present invention has therefore been that of obtaining a brown tint while keeping the characteristics of absorption of the UV and IR radiation inherent in the fragile $Fe^{3+}/Fe^{2+}$ equilibrium.

In order to obtain the brown color desired, it has firstly been envisaged to add oxides such as those of manganese, vanadium or cerium. However, due to their polyvalent character, these oxides tend to deeply disrupt the equilibrium between these two aforementioned redox states of iron and therefore tend to deteriorate the characteristics of absorption of the UV and IR. Within this context, the Applicant proposes the original intervention of selenium oxide. The brown color sought-after has therefore been obtained while keeping the adequate levels of UV and IR absorption.

In order to take the other attributes of the glass into account, particularly its ability to fill the criteria of traffic light recognition for which the form of the light spectrum in the visible part is critical, it may be necessary to use oxides of Co and Ni and to optimize their relative proportions.

Thus, within the context of the present invention, the Applicant proposes glasses which meet the specifications given above insofar as, in a matrix of appropriate inorganic glass, they include an appropriate "coloring filler" based on $Fe_2O_3$ and $SeO_2$, which may also contain NiO and/or $CO_3O_4$.

Furthermore, the finishing of the glasses of the invention can be carried out in a conventional manner by the addition of arsenic oxide or antimony oxide. However, these polyvalent oxides also interfere with the degree of redox of the iron and therefore deeply modify the optical characteristics described above. From this, it is preferable to use to this end halogen elements to fill the necessary function of finishing of the glass and to guarantee the absence of undesirable gaseous inclusions in it. Preferably, bromine is brought in.

According to another of its objectives, the present invention relates to the use of the brown glasses such as described above as ophthalmic lenses. In other words, another object of the present invention is ophthalmic lenses in a brown solar glass of the invention. These are original fixed tint lenses.

The invention is illustrated in a manner which is in no way limiting, by Examples 1 to 8 below. The glasses of said Examples, whose compositions are given in the Table below, have been obtained in the laboratory by melting in silica crucibles. Their characteristics are however similar to those which could be attained by a melting on an industrial scale. All the measurements reported are obtained from 2 mm thick polished samples. The properties are designated in the following manner.

Tv integrated visible transmission x,y chromatic coordinates indicating the color of the glass UV wavelength at which the transmission in the ultraviolet range is 1%

IR level of transmission at the wavelength of 1,100 nm

TSR ability to fill the criteria of traffic light recognition.

The values for these parameters obtained are given in Table 1 below.

BRIEF DESCRIPTION OF THE DRAWING

FIG. 1 in annex to the present description shows the color polygon desired (for more details, the trichromatic coordinates shall be referred to which are indicated in the introduction to the present text).

On said FIG. 1, the chromatic characteristics of the glasses of Examples 1 to 8 are given.

TABLE 1

| | Examples | | | | | | | |
|---|---|---|---|---|---|---|---|---|
| | 1 | 2 | 3 | 4 | 5 | 6 | 7 | 8 |
| Composition (% by weight) | | | | | | | | |
| $SiO_2$ | 67.325 | 67.465 | 66.785 | 67.445 | 67.38 | 66.765 | 67.325 | 66.775 |
| $B_2O_3$ | 4.1 | 4.1 | 4.1 | 4.1 | 4.1 | 4.1 | 4.1 | 4.1 |
| $Na_2O$ | 8.4 | 8.4 | 8.4 | 8.4 | 8.4 | 8.4 | 8.4 | 8.4 |
| $K_2O$ | 11.7 | 11.7 | 11.7 | 11.7 | 11.7 | 11.7 | 11.7 | 11.7 |
| CaO | 0.8 | 0.8 | 0.8 | 0.8 | 0.8 | 0.8 | 0.8 | 0.8 |
| Br | 1.1 | 1.1 | 1.1 | 1.1 | 1.1 | 1.1 | 1.1 | 1.1 |
| $Fe_2O_3$ | 6.4 | 6.4 | 7 | 6.4 | 6.4 | 7 | 6.4 | 7 |
| NiO | 0.155 | 0 | 0.1 | 0 | 0.075 | 0.12 | 0.155 | 0.1 |
| $CO_3O_4$ | 0 | 0.0050 | 0 | 0.0100 | 0 | 0 | 0 | 0 |
| $SeO_2$ | 0.0200 | 0.0300 | 0.0150 | 0.0450 | 0.0450 | 0.0150 | 0.0200 | 0.0250 |
| Properties | | | | | | | | |
| Tv | 11.4 | 25.0 | 18.1 | 17.9 | 17.9 | 17.3 | 14.6 | 15.2 |
| x | 0.4206 | 0.4100 | 0.3969 | 0.4136 | 0.4207 | 0.4001 | 0.3901 | 0.4154 |
| y | 0.3979 | 0.4062 | 0.4064 | 0.4049 | 0.4076 | 0.4042 | 0.3893 | 0.4096 |
| TSR | Yes | Yes | Yes | Yes | Yes | Yes | Yes | Yes |
| UV | 387 | 386 | 388 | 387 | 387 | 388 | 385 | 389 |
| IR | 5.2 | 7.8 | 4.5 | 5.5 | 5.9 | 6.9 | 5.0 | 4.1 |

What is claimed is:

1. Brown solar glasses, absorbing ultraviolet and infrared radiation, having the following composition, expressed in percentages by weight:

| | |
|---|---|
| $SiO_2$ | 64–71 |
| $B_2O_3$ | 2–8 |
| $Al_2O_3$ | 0–4 |
| $ZrO_2$ | 0–2 |
| $Li_2O$ | 0–4 |
| $Na_2O$ | 6–10 |
| $K_2O$ | 7–16 |
| CaO | 0–5.5 |
| ZnO | 0–5.5 |
| $TiO_2$ | 0–2 |
| $Fe_2O_3$ | 5.5–9 |
| $Co_3O_4$ | 0–0.030 |
| NiO | 0–0.2 |
| $SeO_2$ | 0.0030–0.1 |
| $As_2O_3$ | 0–0.1 |
| $Sb_2O_3$ | 0–0.1 |
| $SnO_2$ | 0–0.1 |
| Cl | 0–2 |
| Br | 0–2 |
| F | 0–2. |

2. Brown solar glasses, absorbing ultraviolet and infrared radiation, having the following composition, expressed in percentages by weight:

| | |
|---|---|
| $SiO_2$ | 66–69 |
| $B_2O_3$ | 3–5 |
| $Na_2O$ | 7–9 |
| $K_2O$ | 9–14 |
| CaO | 0.5–2 |
| $Fe_2O_3$ | 5.5–8 |
| $Co_3O_4$ | 0–0.020 |
| NiO | 0–0.16 |
| $SeO_2$ | 0.0050–0.0600 |
| Br | 0.5–1.5. |

3. Solar ophthalmic lenses in a glass according to one of claims 1 or 2.

* * * * *